US012709135B2

(12) United States Patent
Moffitt

(10) Patent No.: US 12,709,135 B2
(45) Date of Patent: Aug. 18, 2026

(54) MOUNTING ASSEMBLY FOR ATTACHING A VENTILATION DEVICE TO A STRUCTURE

(71) Applicant: Matt Moffitt, Huntington Beach, CA (US)

(72) Inventor: Matt Moffitt, Huntington Beach, CA (US)

( * ) Notice: Subject to any disclaimer, the term of this patent is extended or adjusted under 35 U.S.C. 154(b) by 524 days.

(21) Appl. No.: 18/203,611

(22) Filed: May 30, 2023

(65) Prior Publication Data

US 2023/0382191 A1 Nov. 30, 2023

Related U.S. Application Data

(60) Provisional application No. 63/346,940, filed on May 30, 2022.

(51) Int. Cl.
*B60H 1/24* (2006.01)
*B60H 1/00* (2006.01)

(52) U.S. Cl.
CPC ............. *B60H 1/245* (2013.01); *B60H 1/248* (2013.01); *B60H 2001/00635* (2013.01)

(58) Field of Classification Search
CPC .................... B60H 1/245; B60H 1/248; B60H 2001/00635
USPC .......................................................... 454/136
See application file for complete search history.

(56) References Cited

U.S. PATENT DOCUMENTS 4,104,825 A * 8/1978 Hosmer ................. B60J 7/1642 160/369
5,797,791 A * 8/1998 Humphrey ................. B60J 1/08 454/94
7,201,110 B1 * 4/2007 Pawlak ...................... B63J 2/04 114/211
7,588,652 B2 * 9/2009 Repp .......................... B60J 1/14 156/108
2015/0140916 A1 * 5/2015 Bickel .................... B60H 1/262 454/145
2023/0182538 A1 * 6/2023 Zhu ........................ B60H 1/262 454/162

* cited by examiner

*Primary Examiner* — Avinash A Savani
*Assistant Examiner* — Dana K Tighe
(74) *Attorney, Agent, or Firm* — Key Kesan Dallmann PLLC

(57) ABSTRACT

The present disclosure relates to a mounting assembly for attaching a ventilation device to a structure. The structure comprises an inner surface, an outer surface, and a first opening extending therebetween. The mounting assembly comprises an outer protective member configured to have a top side and a bottom side, a plurality of sealing members, at least one gasket, a bottom mounting member, and a plurality of bolts. The mounting assembly of the present disclosure enables a watertight seal and weatherproof installation of the ventilation device to the structure and prevents theft of the ventilation device. Moreover, the mounting assembly enables easy installation of the ventilation device using one or more components of the mounting assembly, consumes less time, enables easy removal, and is reusable with other ventilation devices. The mounting assembly is cost effective.

19 Claims, 11 Drawing Sheets

MOUNTING ASSEMBLY FOR ATTACHING A VENTILATION DEVICE TO A STRUCTURE

CROSS-REFERENCE TO RELATED APPLICATIONS

This application claims the benefit of priority to U.S. Provisional Patent Application Ser. No. 63/346,940 entitled Vent Fan Apparatus for Vehicles filed May 30, 2022, and the entirety of which is incorporated fully herein by this reference.

BACKGROUND—FIELD OF THE INVENTION

The present disclosure generally relates to a mechanical apparatus for ventilation of a structure, and more particularly, to a mounting assembly for attaching a ventilation device to the structure.

BACKGROUND OF THE INVENTION

A roof vent is an opening in a roof of a structure such as large-sized vehicles, buildings, enclosures, agricultural settings and the like. The roof vent is a critical component which aids in ventilation by facilitating exchange of air between inside and outside of the structure, commonly known as passive ventilation. Ventilation serves numerous functions, including removing air pollutants and odors, and aiding in climate control. This is accomplished by exhausting hot air that rises to the roof of the structure while pulling clean air or fresh air inside the structure, creating an airflow into the structure. Generally, vent fans are located at the roof of the structure for facilitating air exchange actively and are comprised of plastic, or more specifically, polyethylene. To install an air vent fan, an opening is first cut in the roof. After, a bonding adhesive sealant, such as silicon resin, is applied between an outside of the roof around the opening and an outside flange of the vent fan which will sit around the outside of the opening on top of the roof. Butyl caulk tape may also be used between the roof and an undersurface of the outside flange to function as a gasket between the roof and the outside flange to prevent moisture infiltration. Thereafter, the vent fan is secured to the roof by fastening the outside flange to the roof using screws, which typically protrude through the roof into a carrier space in the case of a vehicle roof vent where the vehicle's passengers are located or an attic space. Thereafter, significant amount of the sealant is applied around a topside of the outside flange to seal the screws, as well as around the outside of the flange to further prevent leaks.

Several vent fans exist in the prior art for vehicles, one example being the Maxxfan Deluxe. However, current vent fan implementations or installation requires the use of a sealant to cover the screw holes and to create a watertight seal around the flange of a fan mount. Here, the sealant is critical when installing the vent fan, and it is necessary that the sealant be properly applied to prevent leaks that can lead to moisture and energy loss problems. This raises the potential for user error, as well as increases the cost and complexity of installation.

Existing mounting assemblies do not enable complete watertight sealing and do not prevent moisture infiltration inside the structure when the vent fan is attached using the mounting assemblies. Further, in the case of a roof of the vehicle, vehicle's occupants are exposed to the screws that are used for fastening the vent fan, which pose danger to the occupants. Furthermore, current vent fan implementations are difficult and messy to install, and often require professional installation that is both costly and time-consuming.

Therefore, a need exists for a reusable mounting assembly for creating a watertight seal while attaching a ventilation device to a structure and enabling easy installation.

BRIEF SUMMARY OF THE INVENTION

An object of the present disclosure is to provide a mounting assembly for attaching a ventilation device to a structure which forgoes use of a sealant.

Another object of the present disclosure is to provide a mounting assembly that provides watertight seal and weatherproof between a ventilation device and a structure.

Yet another object of the present disclosure is to provide a mounting assembly that provides rigidity to a ventilation device and a structure after installation.

Yet another object of the present disclosure is to provide a mounting assembly that enables easy installation of a ventilation device to a structure in less time.

Yet another object of the present disclosure is to provide a mounting assembly that is easy to remove and is reusable with other ventilation devices.

Yet another object of the present disclosure is to provide a mounting assembly that is less expensive.

Yet another object of the present disclosure is to provide a mounting assembly that protects and prevents theft of a ventilation device when attached to a structure.

Yet another object of the present disclosure is to provide a mounting assembly for attaching a ventilation device to the roof of a vehicle.

Yet another object of the present disclosure is to provide a mounting assembly that provides safety to occupants inside a vehicle, from screws that are used for attaching a ventilation device to the roof of a vehicle.

In some embodiments, the mounting assembly for attaching the ventilation device to the structure having an inner surface, an outer surface, and a first opening therebetween. The mounting assembly comprises an outer protective member configured to have a top side and a bottom side, a plurality of sealing members, at least one gasket, and a bottom mounting member.

In some embodiments, the mounting assembly further comprises a plurality of bolts with a button head cap for passing through a corresponding first, second, third, and fourth threaded hole in the outer protective member, a ventilation device mount, the at least one gasket, and the bottom mounting member, respectively from the inner surface of the structure.

In some embodiments, the present disclosure sets forth a ventilation assembly that comprises a ventilation device and a mounting assembly described herein.

In some embodiments, the present disclosure sets forth a method of attaching a ventilation device to a structure having an inner surface, an outer surface, and a first opening therebetween. The method comprises positioning at least one gasket on the outer surface of the structure around the first opening, positioning a ventilation device mount above the at least one gasket, the ventilation device mount is configured to receive the ventilation device within a third opening therein, positioning a plurality of sealing members in an outer protective member, placing the outer protective member along with the plurality of sealing members above the ventilation device mount, placing a bottom member on the inner side of the structure around the first opening, and fastening each of a plurality of bolts through a corresponding first, second, third, and fourth threaded hole in the outer protective member, the ventilation device mount, the at least one gasket, and the bottom mounting member, respectively, for attaching the ventilation device to the structure.

The mounting assembly of the present disclosure creates a watertight seal with corresponding holes or apertures after attaching the ventilation device to the structure and also provides weatherproofing. Moreover, the mounting assembly enables easy installation of the ventilation device using one or more components of the mounting assembly, consumes less time, enables easy removal, and is reusable with other ventilation devices. The mounting assembly is cost effective.

These and other objectives of the present disclosure will become obvious to those of ordinary skill in the art after reading the following detailed description of the preferred embodiments. It is to be understood that the foregoing general description and the following detailed description are exemplary and are intended to provide further explanation of the disclosure as claimed.

BRIEF DESCRIPTION OF THE DRAWINGS

Embodiments of the present disclosure may best be understood by referring to the following description and accompanying drawings that are used to illustrate the present disclosure wherein like reference numerals refer to similar elements throughout the Figures. In the drawings.

DETAILED DESCRIPTION OF THE INVENTION

Embodiments of the present disclosure are described herein in the context of a mounting assembly that enables watertight and weatherproof installation of a ventilation device to a structure. The mounting assembly further enables easy installation and removal, and is reusable with other ventilation devices. Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will now be made in detail to implementations of the present disclosure as illustrated in the accompanying drawings. The same reference indicators will be used throughout the drawings and the following detailed description to refer to the same or like parts.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The present disclosure relates to a mounting assembly that comprises an outer protective member, a plurality of sealing members, a plurality of bolts, at least one gasket, and a bottom mounting member. The mounting assembly creates a watertight seal with an aperture, or a hole positioned at the structure and enables weatherproof sealing of the ventilation device to the structure. Moreover, the mounting assembly enables easy installation of the ventilation device using one or more components of the mounting assembly, consumes less time, not messy, and is cost effective. Lastly, the mounting assembly of the present disclosure will provide additional rigidity to the structure and the ventilation device that the existing implementations lack by virtue of the outer protective member and the at least one gasket.

Figure 1:
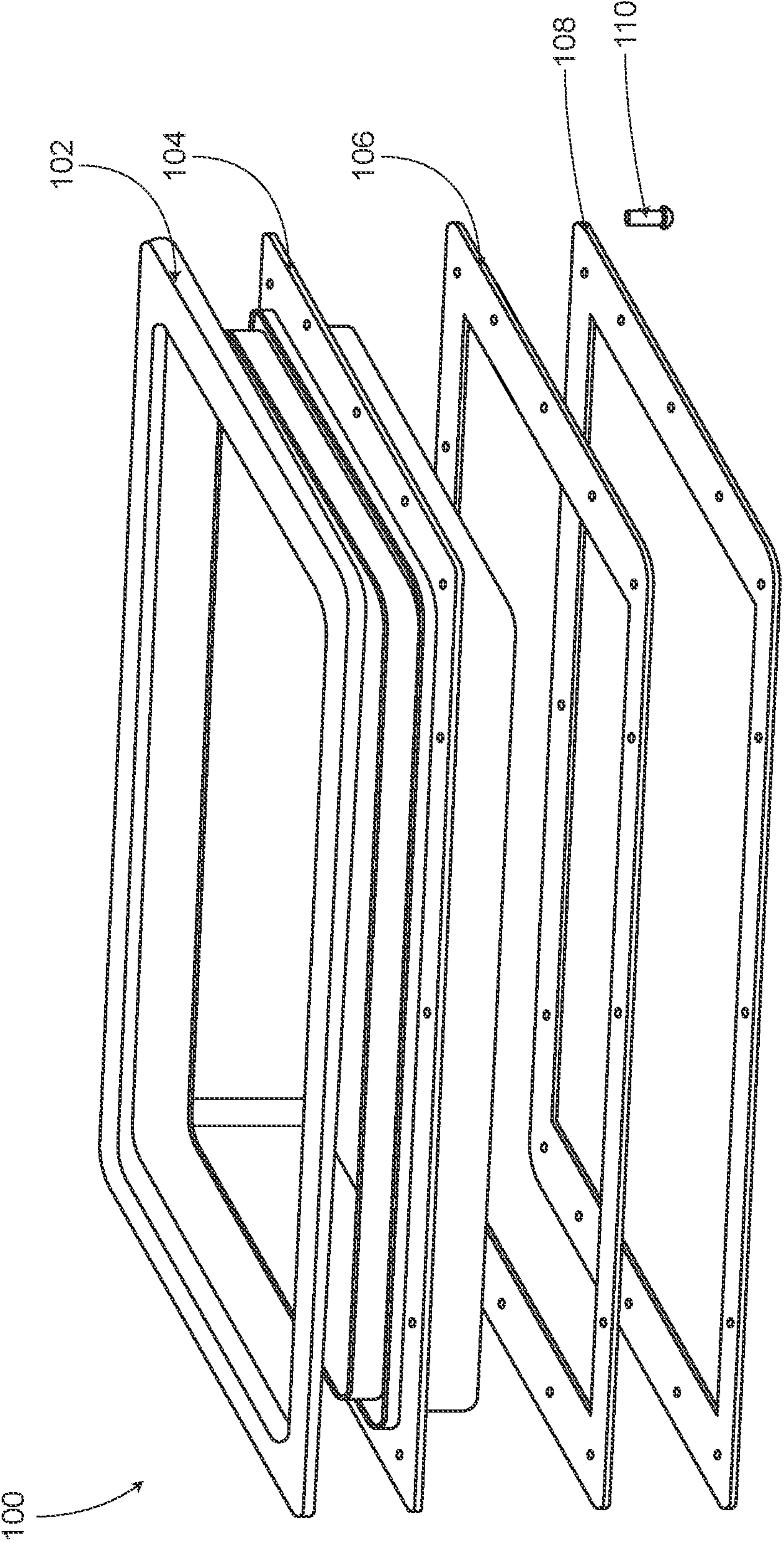
FIGS. 1-2 illustrate exemplary perspective and side exploded views of a mounting assembly with a ventilation device mount in accordance with the present disclosure.
Figure 2:
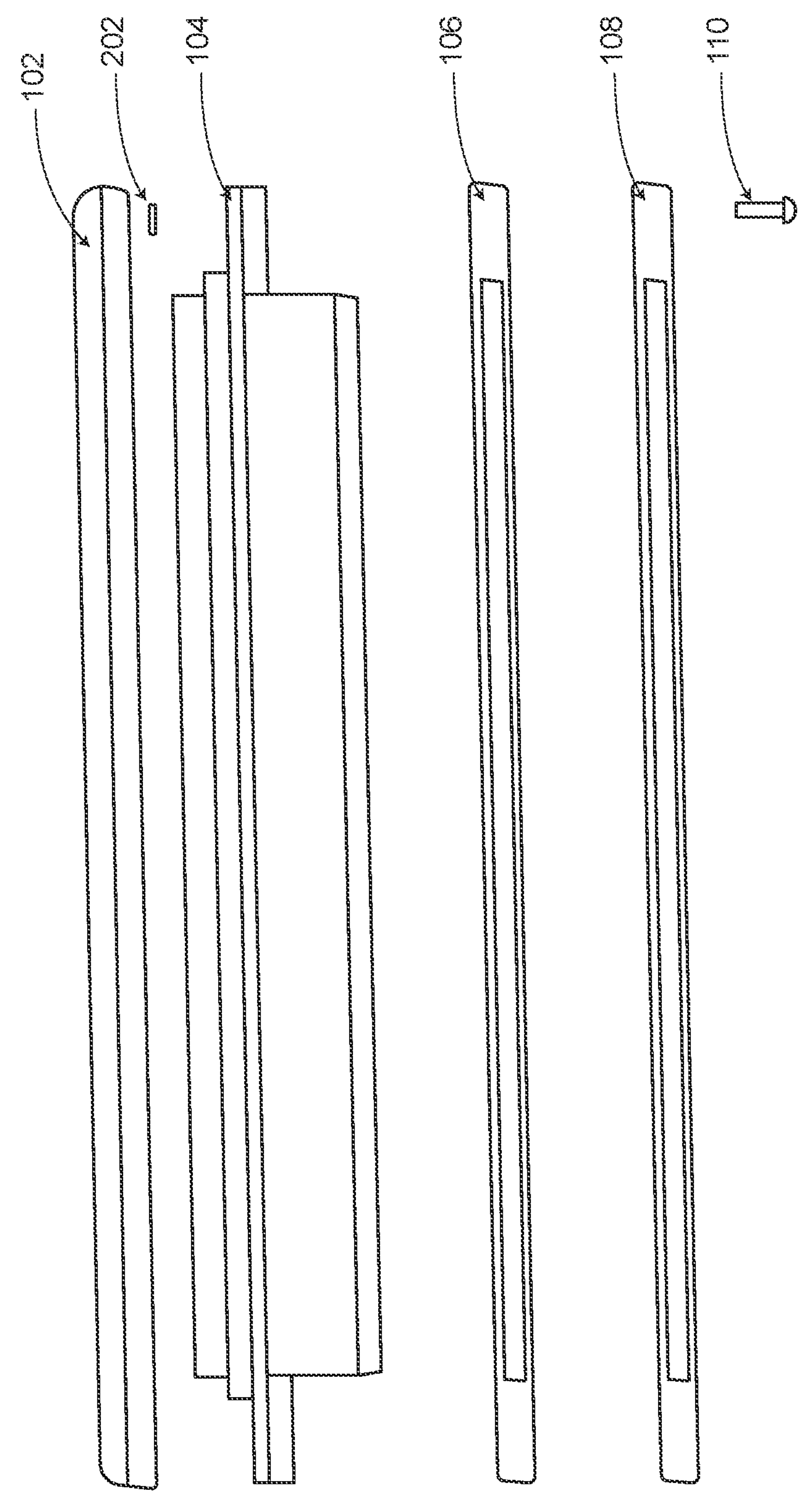
Figure 3:
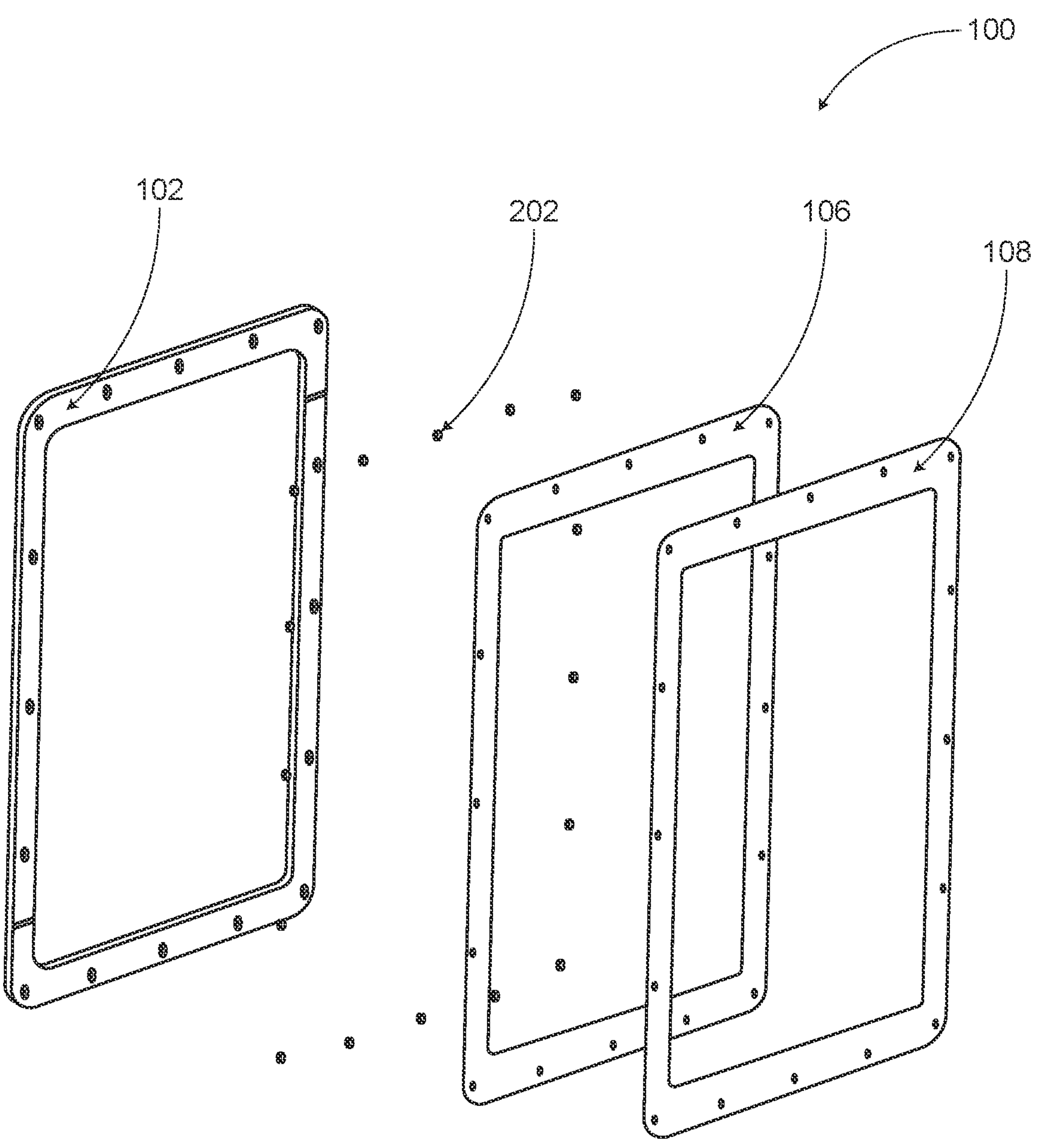
FIG. 3 illustrates an exemplary exploded view of a mounting assembly in accordance with the present disclosure.

Reference is initially made to FIGS. 1-3, which illustrates an exemplary mounting assembly 100 in accordance with the present disclosure. The mounting assembly 100 is configured for attaching a ventilation device to a structure. The structure is to be understood as a component or a part of a vehicle, a building, agricultural settings, machinery housings or enclosures and the like. More particularly, the structure may be a roof or a wall that comprises an inner surface, an outer surface, and a first opening extending through the structure between the inner surface and the outer surface. The size and shape of the first opening corresponds to a size and shape of the ventilation device to be attached to the structure. The inner surface of the structure corresponds to an interior of the structure. Similarly, the outer surface of the structure corresponds to an exterior of the structure or exposed to an outside environment. In one example, if the structure is a roof of a vehicle, the inner surface of the roof corresponds to the vehicle's cabin which occupies passengers and driver, commonly referred as occupants. The outer surface of the roof corresponds to an outside environment. The ventilation device refers to an apparatus that facilitates exchange of air between inside and outside of the structure for removing air pollutants, and odors, and aiding in climate control. The ventilation device may be an air vent fan. The mounting assembly 100 comprises one or more components that include an outer protective member 102, a plurality of sealing members 202, at least one gasket 106, a bottom mounting member 108, and a plurality of bolts 110. The mounting assembly 100 attaches the ventilation device to the structure using the one or more components of the mounting assembly 100.

The at least one gasket 106 is configured to be positioned on the outer surface of the structure around the first opening in the structure. The at least one gasket 106 is further configured to receive the ventilation device mount 104 on top thereof. The ventilation device mount 104 is configured to receive the ventilation device therein and receive the outer protective member 102 on top the ventilation device mount 104. The bottom mounting member 108 is configured to be positioned at the inner surface of the structure. Thereafter, the ventilation device is attached to the structure by fastening the plurality of bolts 110 through corresponding holes in the outer protective member 102, the ventilation device mount 104, the at least one gasket 106, the bottom mounting member 108, and the structure.

Now reference is made to FIGS. 4-9, which illustrate the outer protective member 102 of the mounting assembly 100 in accordance with the present disclosure. The outer protective member 102 is configured to rest outside or the outer surface of the structure. The outer protective member 102 is configured to have a top side 402 and a bottom side 502. The top side 402 and the bottom side 502 constitute a mounting area of the outer protective member 102. The top side 402 of the outer protective member 102 is a side that is exposed to the outside environment. The bottom side 502 of the outer protective member 102 is a side that corresponds to the outer surface of the structure and is disposed at an opposite side of the top side 402. In other words, the bottom side 502 faces the outer surface of the structure while attaching the ventilation device to the structure.

The outer protective member 102 comprises a plurality of first threaded holes 702 at the bottom side 502 of the outer protective member 102. The plurality of first threaded holes 702 are uniformly distributed on the bottom side 502 of the outer protective member 102 for receiving the plurality of bolts 110 to attach the ventilation device to the structure (seen in FIGS. 7-9). In one non-limiting example, the outer protective member 102 comprises 16 threaded holes. The plurality of first threaded holes 702 is configured to have a first depth (d1) at the bottom side 502 (seen in FIG. 8), thereby forming a plurality of non-through threaded holes on the bottom side 502 and forming the top side 402 as a plain surface. In other words, the plurality of first threaded holes 702 are blind holes which do not pass through an entire surface of the outer protective member 102. Accordingly, the outer protective member 102 functions as a cap to cover the plurality of sealing members 202, the ventilation device mount 104, the at least one gasket 106, and the plurality of bolts 110 on top side of the structure. The outer protective member 102 forgoes the use of a sealant to cover aperture or holes in the ventilation device mount 104 and the structure after attaching the ventilation device to the structure. Further, the outer protective member 102 enables easy installation of the ventilation device and improves longevity of the mounting assembly 100 by reducing the risk of sealant failure over time. Furthermore, unlike sealant, the outer protective member 102 provides more rigidity and less mess by utilizing uniformly distributed first threaded holes 702 to accept the plurality of bolts 110 for clean mounting.

Figure 4:
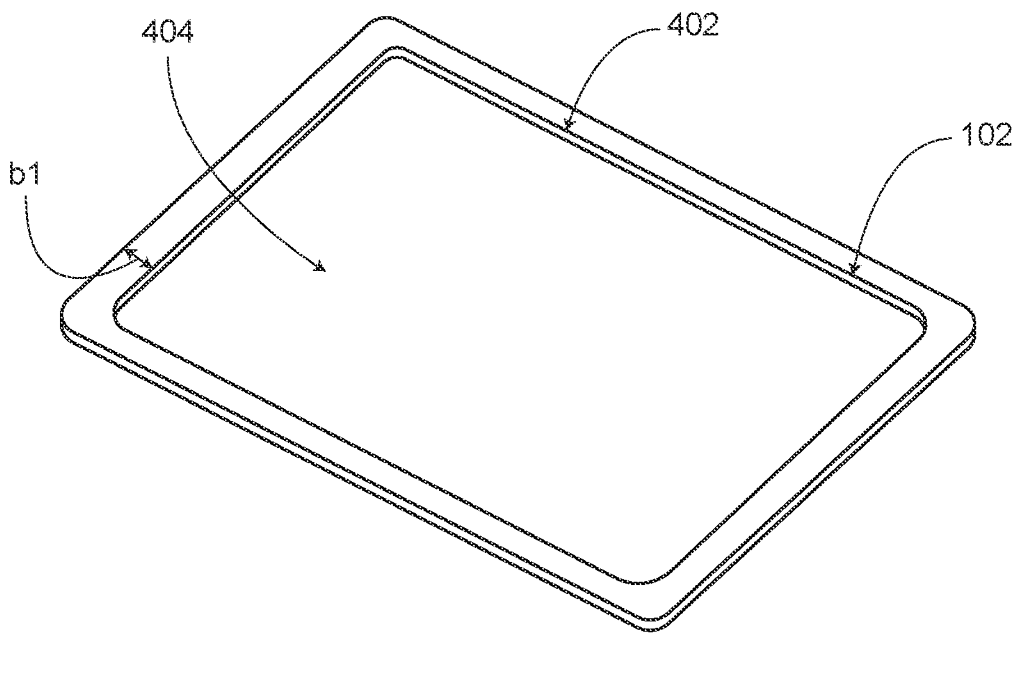
FIG. 4 illustrates an exemplary top perspective view of an outer protective member of a mounting assembly in accordance with the present disclosure.
Figure 5:
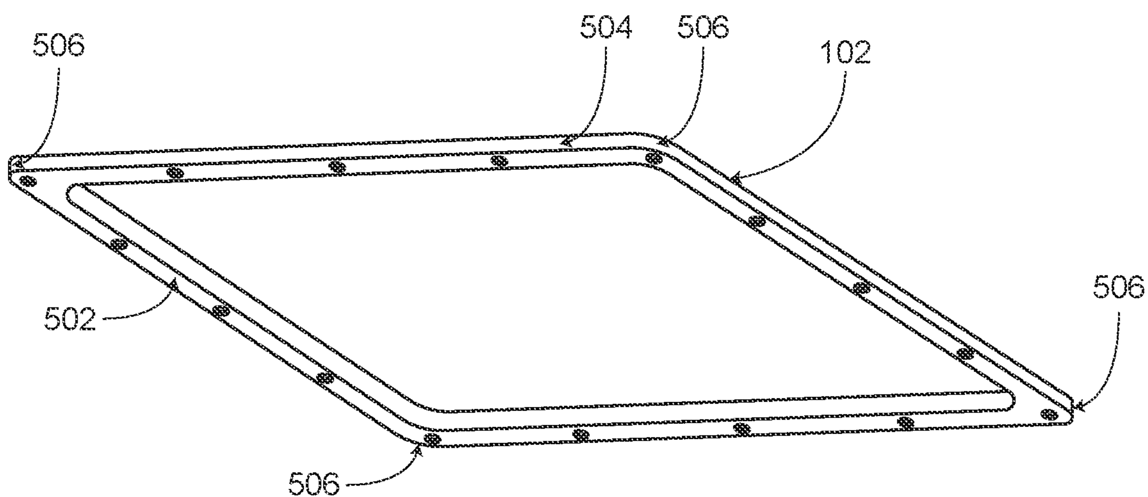
FIG. 5 illustrates an exemplary bottom perspective view of an outer protective member of a mounting assembly in accordance with the present disclosure.
Figure 6:
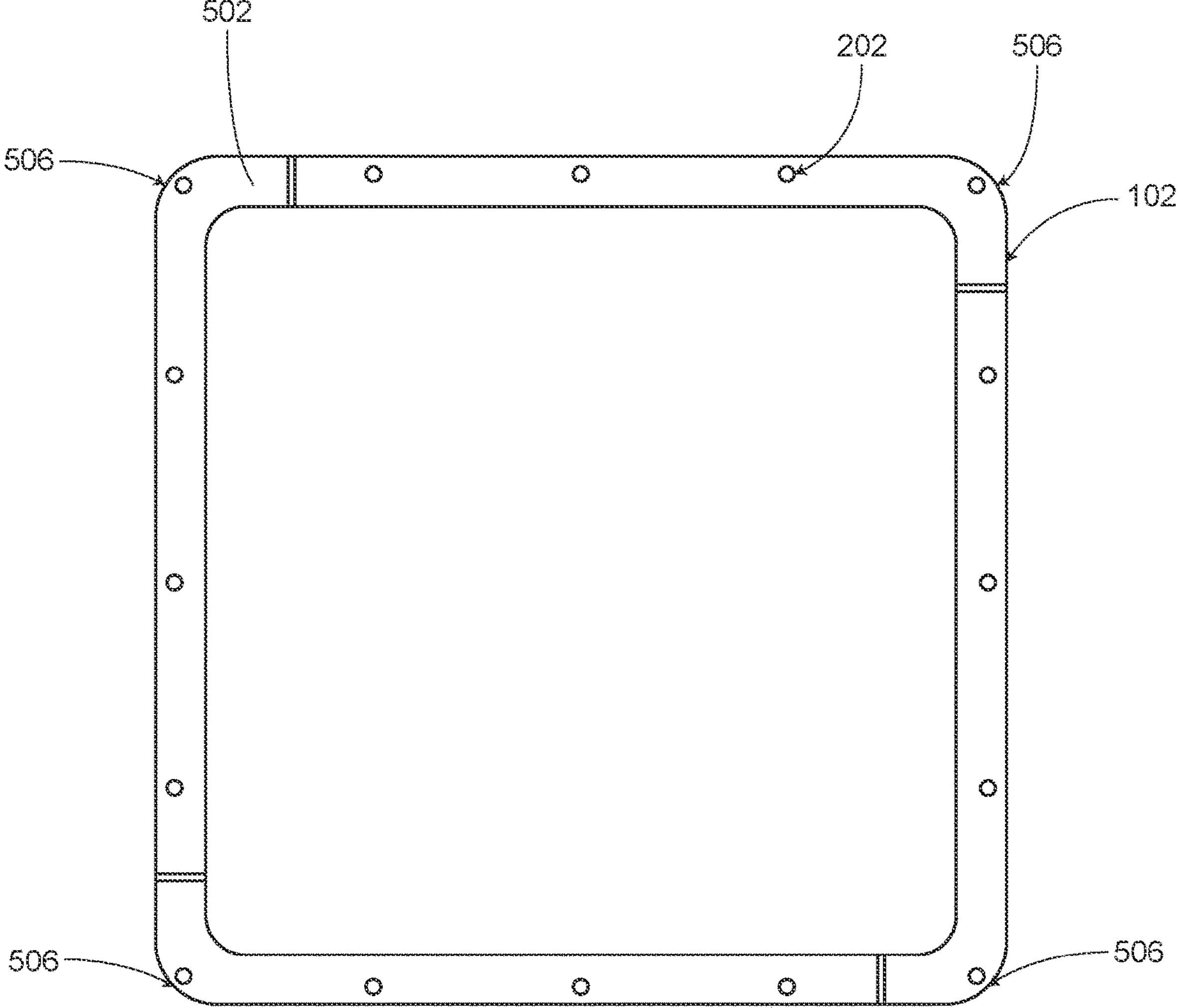
FIG. 6 illustrates an exemplary view of a bottom side of an outer protective member with sealing members in accordance with the present disclosure.

The outer protective member 102 further comprises a plurality of first side walls 504, a plurality of first rounded corners 506 and a second opening or aperture 404 as similar to the first opening in the structure (seen in FIGS. 4-5). The second opening 404 in the outer protective member 102 corresponds to a shape and size of the first opening in the structure. The plurality of first side walls 504 are extending or projecting towards the outer surface of the structure, thereby forming an enclosure or a housing to cover edges of the ventilation device mount 104, the at least one gasket 106. Accordingly, the outer protective member 102 completely shields or seal the plurality of sealing members 202, the ventilation device mount 104, the at least one gasket 106, and the plurality of bolts 110 from dust, moisture, physical damage, air leakage, water leakage and the like. Each of the plurality of first side walls 504 is configured to have a first height (H1) (seen in FIG. 8). It is to be noted that the height of the first side walls 504 of the outer protective member 102 depends on a thickness of the ventilation device mount 104, the at least one gasket 106, and the plurality of bolts 110. In one example, the outer protective member 102 comprises four side walls 504. Furthermore, the outer protective member 102 is configured to protect the ventilation device from theft as the outer protective member 102 offers complete shielding of remaining components of the mounting assembly 100. Further, the plurality of first rounded corners 506 of the outer protective member 102 prevents risk of injury while installing the ventilation device, and is resistant to damage. In one example, the outer protective member 102 comprises four rounded corners 506 at an inner and outer periphery. In some exemplary embodiments, the thickness of the outer protective member 102 may vary by 0.02 inches. In specific embodiments, the thickness of the outer protective member 102 may be 0.375 inches. It is to be noted that the height of the first side walls 504 is proportional to the thickness of the outer protective member 102. In some exemplary embodiments, breadth (b1) of the top side 402 or the bottom side 502 may vary by 0.05 inches. In specific embodiments, the breadth (b1) of the top side 402 or the bottom side 502 may be 0.975 inches. It is to be understood that the breadth (b1) of the top side 402 or the bottom side 502 is a distance from one edge of the top side 402 or the bottom side 502 to the other edge.

Figure 7:
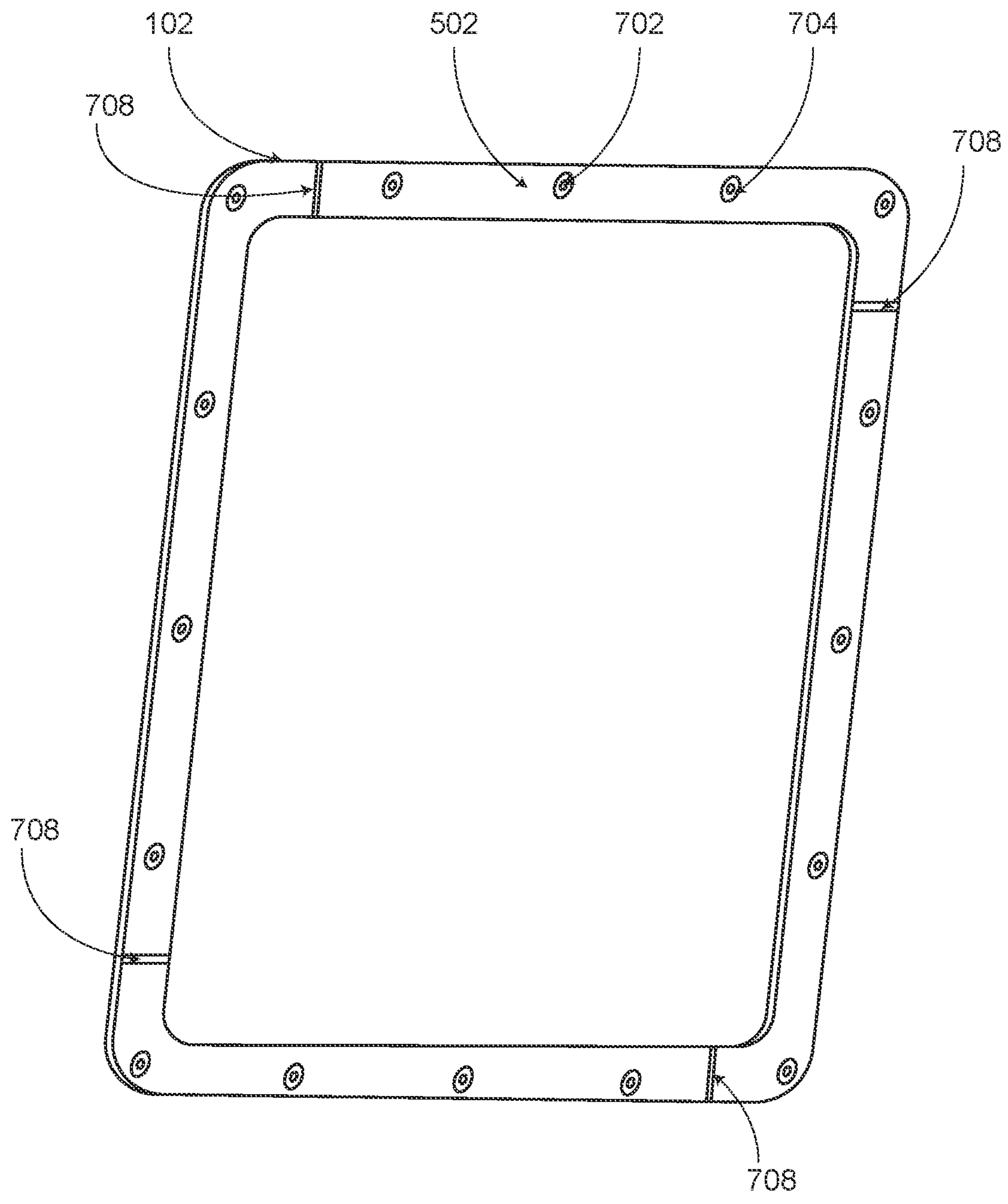
FIG. 7 illustrates an exemplary view of a bottom side of an outer protective member without sealing members in accordance with the present disclosure.
Figure 8:
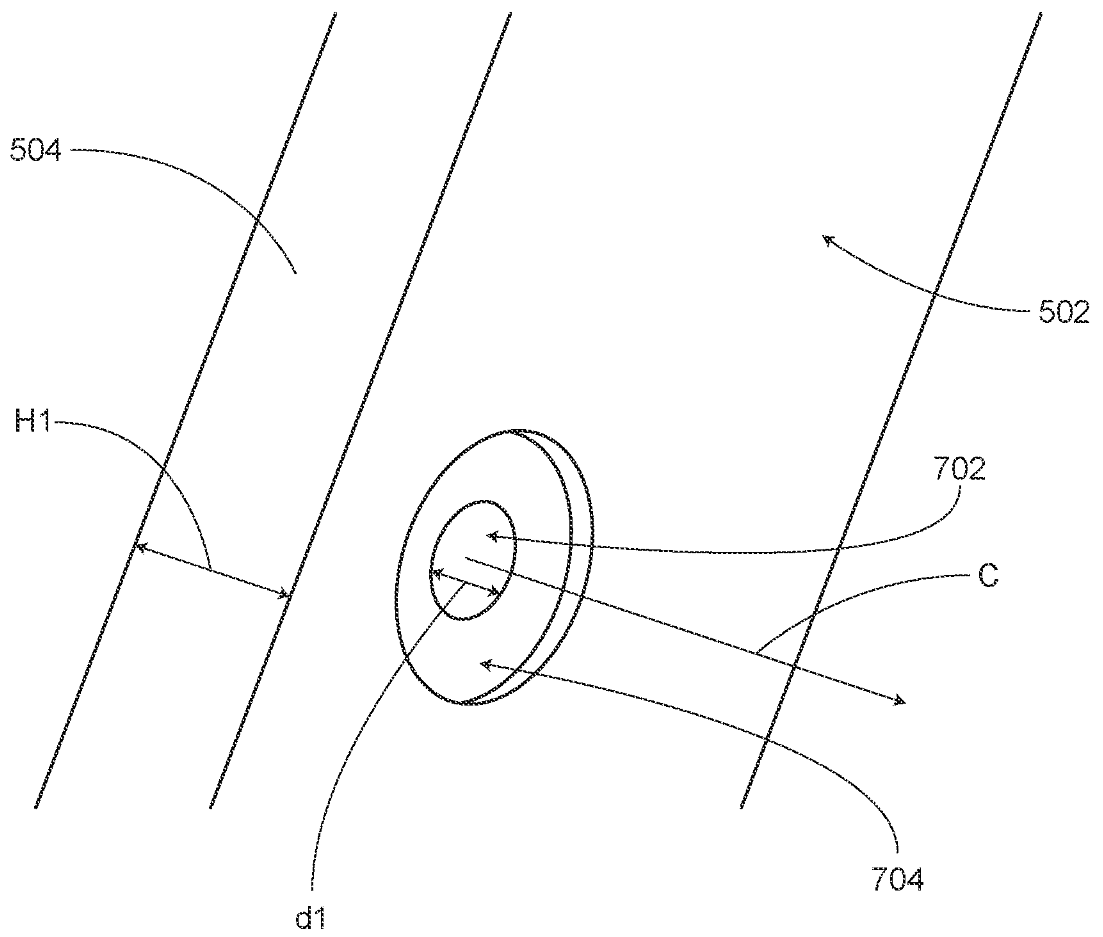
FIGS. 8-9 illustrate exemplary side views of a first threaded hole, a counter bore, side walls of an outer protective member in accordance with the present disclosure.
Figure 9:
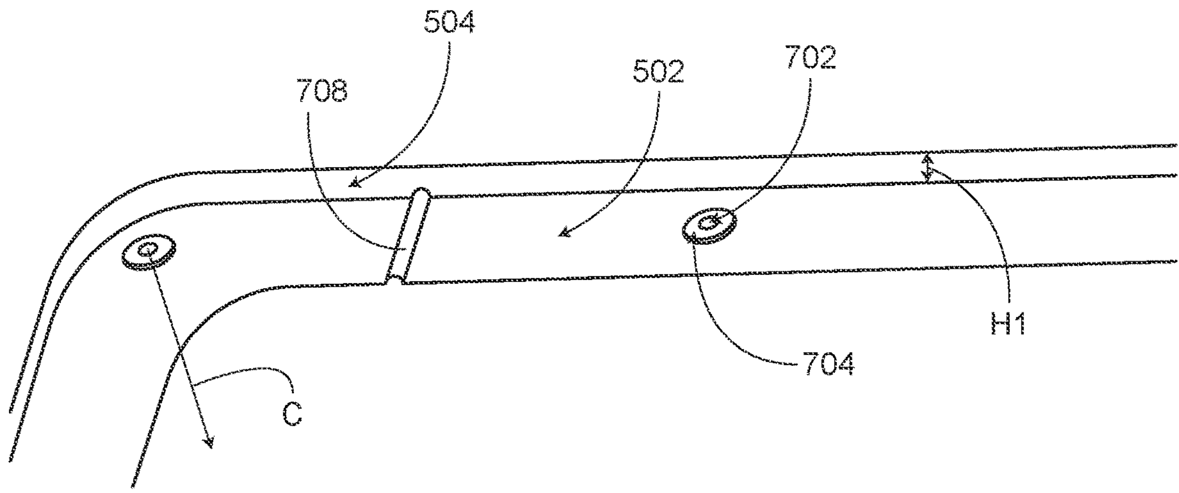

The outer protective member 102 further comprises a plurality of counter bores 704 at the bottom side 502 of the outer protective member 102 (seen in FIGS. 7-8). Each of the plurality of counter bores 704 is configured for receiving at least one sealing member 202 therein. In some embodiments, the sealing member 202 is an O-ring. In one example, the counter bores 704 that are present on corners of the outer protective member 102 may receive more than one sealing member 202 such as more than one O-ring. Accordingly, the plurality of sealing members 202 are positioned at the bottom side 502 of the outer protective member 102 (seen in FIG. 6). Each of the plurality of counter bores 704 is configured to have a central axis (C) that extends vertically when viewed from a top of the outer protective member 102 and further configured to pass through a center of each of the plurality of counter bores 704. The central axis (C) of each of the plurality of counter bores 704 coincides with a central axis (C) of each of the plurality of first threaded holes 702 in the outer protective member 102. In other words, each of the plurality of counter bores 704 is positioned on top of each of the plurality of first threaded holes 702 and enlarges each of the plurality of first threaded holes 702. In one example, the outer protective member 102 comprises 16 counter bores. It is to be noted that a number of the counter bores 704 correspond to a number of the first threaded holes 702. In some embodiments, the bottom side 502 of the outer protective member 102 comprises a plurality of grooves 708 for drainage (seen in FIGS. 7 and 9).

In some embodiments, the outer protective member 102 may be composed of, not limited to, plastic, fiberglass, rubber, or metals, such as aluminum or stainless steel. In one exemplary embodiment, the outer protective member 102 is composed of anodized black aluminum. In yet another exemplary embodiment, the outer protective member 102 is uncoated aluminum. In some embodiments, each of the plurality of sealing members 202 are made of, not limited to, rubber or silicone.

Figure 10:
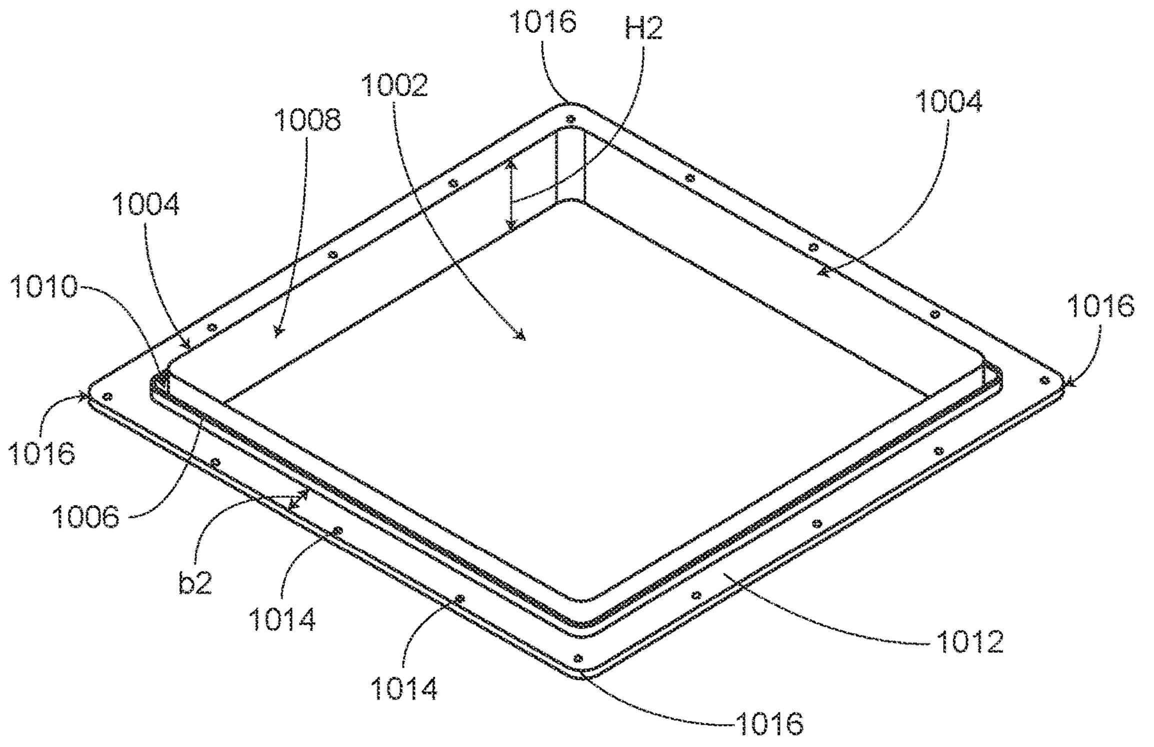
FIG. 10 illustrates an exemplary top perspective view of a ventilation device mount in accordance with the present disclosure.

FIG. 10 illustrates an exemplary ventilation device mount 104 in accordance with the present disclosure. The ventilation device mount 104 is positioned on the outside of the structure and traverses the first opening on the structure. The ventilation device mount 104 is configured to retain or secure the ventilation device for circulating air inside the structure. The outer protective member 102 is positioned adjacent to and on top of the ventilation device mount 104. The plurality of sealing members 202 is positioned between the outer protective member 102 and the ventilation device mount 104 for providing weather proofing. The plurality of sealing members 202 are configured to provide weather proofing preventing the entry of moisture, humidity, or water by enabling a tight seal between the outer protective member 102 and the ventilation device mount 104.

The ventilation device mount 104 comprises a third opening 1002, a first frame member 1004 configured to form the third opening 1002, a second frame member 1006 that is positioned outboard of the first frame member 1004, and a mounting plate 1012 configured to be formed around an outer periphery of the second frame member 1006. The first frame member 1004 comprises a plurality of second side walls 1008 that extend towards the outer surface of the structure and configured to have a second height (H2). The third opening 1002 is configured to receive and secure at least a portion of the ventilation device therein. The third opening 1002 corresponds to a shape and size of the ventilation device. The first frame member 1004 and second frame member 1002 are configured to be placed at a first distance (D1), thereby forming a groove portion 1010 in the ventilation device mount 104 enabled to fit the ventilation device with the ventilation device mount 104. The ventilation device may be secured to the ventilation device mount 104 using one or more fasteners. It is to be noted that the shape, size, and design of the ventilation device mount 104 given in FIG. 10 does not limit the scope of the present disclosure. Different shapes and sizes of the ventilation device mount 104 may be used according to the shape and size of the ventilation device.

The outer protective member 102 is positioned above the mounting plate 1012. The mounting plate 1012 comprises a plurality of second threaded holes 1014. Each of the plurality of second threaded holes 1014 is aligned with a corresponding first threaded hole 702 in the outer protective member 102 when the outer protective member 102 is positioned above the ventilation device mount 104. Each of the plurality of second threaded holes 1014 is a through hole. Through hole is to be understood as a hole that passes through the surface of the mounting plate 1012. It is to be noted that the number of the first threaded holes 702 corresponds to a number of the second threaded holes 1014. The ventilation device mount 102 is positioned above the at least one gasket 106. More particularly, the mounting plate 1012 is positioned above the at least one gasket 106. In some embodiments, the mounting plate 1012 comprises a plurality of second rounded corners 1016 at an outer periphery of the mounting plate 1012 for enabling safety and preventing damage. In some embodiments, the mounting plate 1012 comprises four rounded corners. It is to be understood that the breadth (b2) of the mounting plate 1012 is a distance from one edge of the mounting plate 1012 to the other edge.

Figure 11:
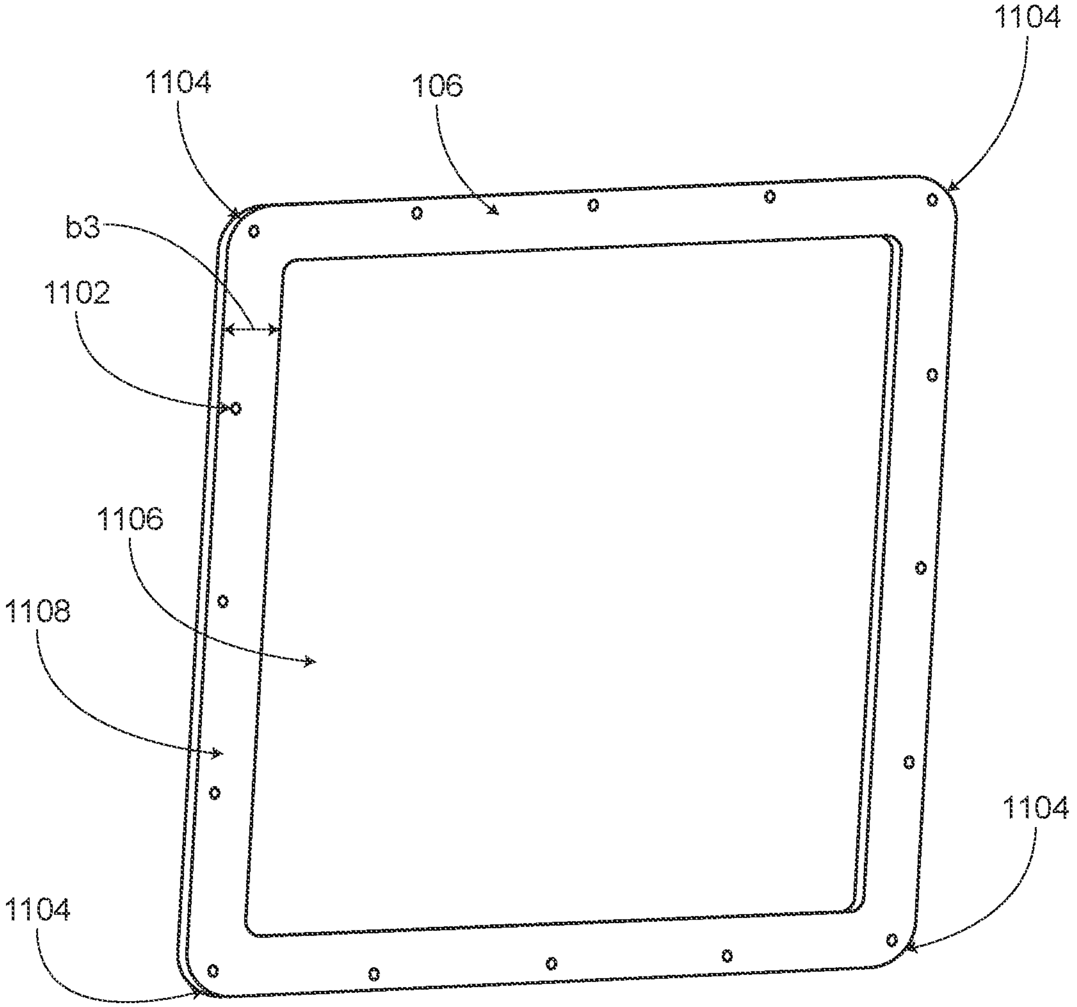
FIG. 11 illustrates an exemplary top perspective view of a gasket of a mounting assembly in accordance with the present disclosure.

With reference to FIG. 11, the at least one gasket 106 is positioned between the ventilation device mount 102 and the structure. The at least one gasket 106 is configured to provide a watertight barrier. The at least one gasket 106 is generally flat, with a fourth opening 1106 that generally matches the size of the first opening at the structure. The at least one gasket 106 is positioned on the outer surface of the structure around the first opening in the structure. The fourth opening 1106 of the at least one gasket 106 is also configured to align with the second opening 404 and the third opening 1106 in the outer protective member 102 and the ventilation device mount 104, respectively. The at least one gasket 106 further comprises a first outside flange 1108, a plurality of third threaded holes 1102 that are uniformly distributed at the first outside flange 1108 which accept the plurality of bolts 110 to connect both the at least one gasket 106 and the bottom mounting member 108 to the structure. Each of the plurality of third threaded holes 1102 is a through hole. The at least one gasket 106 further comprises a plurality of third rounded corners 1104 at an inner and outer periphery of the first outside flange 1108 for enabling safety and preventing damage. In some embodiments, the at least one gasket 106 comprises four rounded corners. In some embodiments, the top side and bottom side of the at least one gasket 106 are substantially the same. In some embodiments, the at least one gasket 106 may be composed of, not limited to, rubber or silicone. It is to be noted that a number of the third threaded holes 1102 corresponds to the number of the first threaded holes 702. The at least one gasket 106 forgoes the use of sealant or butyl caulk tape in between the ventilation device mount 104 and the structure and provides efficient weatherproofing and rigidity to the structure and the ventilation device mount 104. In some exemplary embodiments, the thickness of the at least one gasket 106 may vary between 0.06 and 0.10 inches. In specific embodiments, the thickness of the at least one gasket 106 may be 0.093 inches. In some exemplary embodiments, the breadth (b3) of the first outside flange 1108 may vary by 0.05 inches. In specific embodiments, the breadth (b3) of the first outside flange 1108 may be 1.25 inches. It is to be understood that the breadth (b3) of the first outside flange 1108 is a distance from one edge of the first outside flange 1108 to the other edge.

Figure 12:
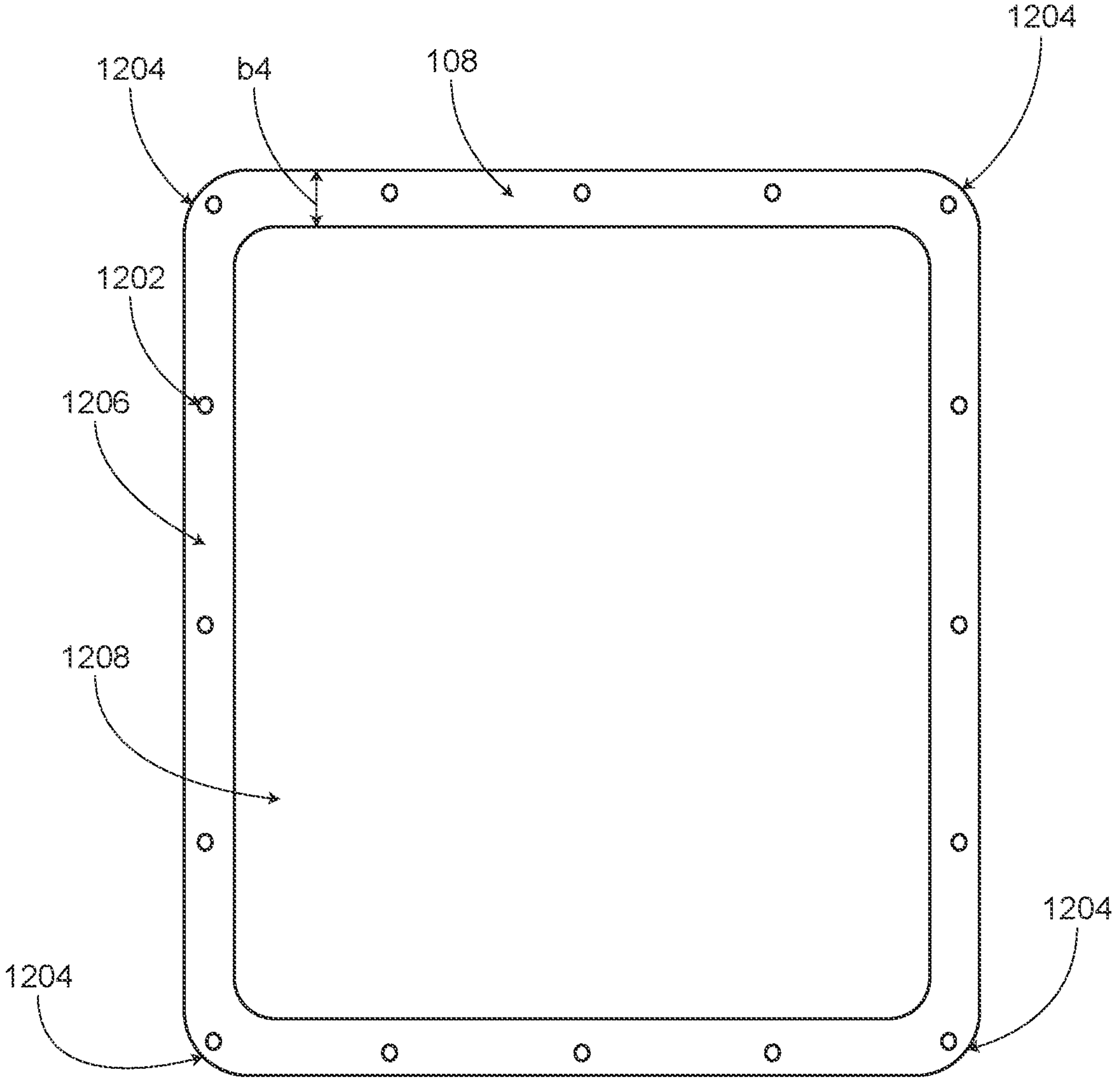
FIG. 12 illustrates an exemplary top perspective view of a bottom mounting member of a mounting assembly in accordance with the present disclosure.

With reference to FIG. 12, the bottom mounting member 108 is positioned on the inner surface of the structure and generally has a same shape as the at least one gasket 106. The bottom mounting member 108 may function as a template of a precise pattern to be used for cutting the first opening and screw holes around the first opening in the structure to aid in installation. The bottom mounting member 108 is configured to secure the ventilation device from inside of the structure. The bottom mounting member 108 comprises a second outside flange 1206, a fifth opening 1208, a plurality of fourth threaded holes 1202 that are uniformly distributed in the second outside flange 1206. Each of the plurality of fourth threaded holes 1202 is configured to align with a corresponding first, second, third threaded hole 702, 1014, 1102 in the outer protective member 102, the ventilation device mount 104, and the at least one gasket 106, respectively. Further, each of the plurality of fourth threaded holes 1202 align with the screw holes around the first opening in the structure. The bottom mounting member 108 further comprises a plurality of fourth rounded corners 1204 at an inner and outer periphery of the second outside flange 1206 for enabling safety and preventing damage. In some embodiments, the bottom mounting member 108 comprises four rounded corners. In some embodiments, the top side and bottom side of the bottom mounting member 108 are substantially the same. In some embodiments, the bottom mounting member 108 may be composed of, not limited to, plastic, fiberglass, rubber, or metals, such as aluminum or stainless steel. In some embodiments, the bottom mounting member 108 is composed of anodized black aluminum. In some exemplary embodiments, the thickness of the bottom mounting member 108 may vary between 0.04 to 0.125 inches. In specific embodiments, the thickness of the bottom mounting member 108 may be 0.04 inches. In some exemplary embodiments, the breadth (b4) of the second outside flange 1206 may vary by 0.025 inches. In specific embodiments, the breadth (b4) of the second outside flange 1206 may be 1.25 inches. It is to be understood that the breadth (b4) of the second outside flange 1206 is a distance from one edge of the second outside flange 1206 to the other edge.

In some embodiments, the breadth of the top side 402/bottom side 502 of the outer protective member, the mounting plate 1012 of the ventilation device mount 104, the first outside flange 1108, and the second outside flange 1306 may be the same.

Figure 13:
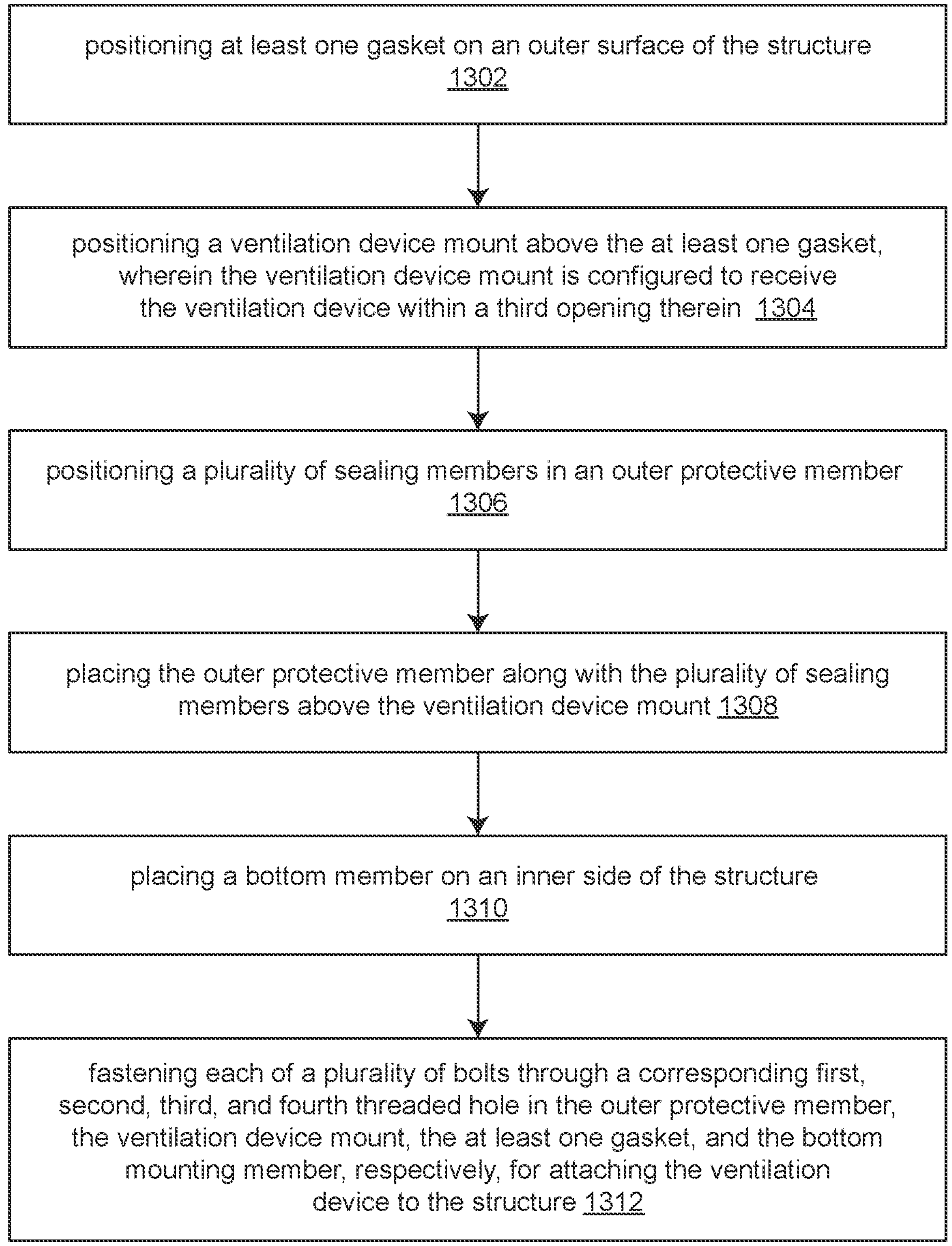
FIG. 13 is an exemplary flow chart that illustrates a method of attaching a ventilation device to a structure in accordance with a present disclosure.

Reference is now made to FIG. 13, which illustrates an exemplary flow chart of a method for installing or attaching a ventilation device to a structure. To install the ventilation device to the structure, the bottom mounting member 108 may be used as a template to cut the first opening through the structure at a desired location and the screw holes around the first opening. At step 1302, the at least one gasket 106 is positioned on the outer surface around the first opening of the structure. At step 1304, the ventilation device mount 104 is positioned or placed above the at least one gasket 106. The ventilation device mount 104 is configured to receive and secure the ventilation device within the third opening therein. At step 1306, the plurality of sealing members 202 is positioned or placed in the outer protective member at the bottom side 502. At step 1308, the outer protective member 102 along with the plurality of sealing members 202 is placed or positioned above the ventilation device mount 102. At step 1310, the bottom mounting member 108 is placed or positioned on the inner side of the structure. At step 1312, each of the plurality of bolts 110 is fastened through a corresponding first, second, third, and fourth threaded hole 702, 1014, 1102, 1202, respectively, in the outer protective member 102, the ventilation device mount 104, the at least one gasket 106, and the bottom mounting member 108, respectively, and through the screw holes in the structure for attaching the ventilation device to the structure. Each of the plurality of bolts 110 consisting of a safe button head cap is screwed or fastened from inner surface of the structure through the uniformly distributed holes of the one or more components of the mounting assembly 100. Each of the plurality of bolts 110 comprises a threaded portion that matches with the corresponding first, second, third, and fourth threaded hole 702, 1014, 1102, 1202, respectively, in the outer protective member 102, the ventilation device mount 104, the at least one gasket 106, and the bottom mounting member 108, respectively.

In one exemplary embodiment, the mounting assembly 100 is used to attach an air vent fan to a roof of a vehicle. To install, the bottom mounting member 108 is first used as a template to cut an opening in the roof and screw holes around the opening through the roof at a desired location. Thereafter, the at least one gasket 106 is mounted on the top or outer side of the roof surrounding the opening, followed by the ventilation device mount 104, and the outer protective member 102. Further, the bottom mounting member 108 is placed on the inner side of the roof of the vehicle. Mounting bolts 110 consisting of the safe button head cap are then screwed from the inner surface or inner side of the vehicle through the uniformly distributed holes of the bottom mounting member 108 up through the roof, the gasket's outside flange 1108, ventilation device mount 104, and the outer protective member 102. Accordingly, the air vent fan is attached to the roof of the vehicle.

In another exemplary embodiment, the present disclosure comprises a ventilation assembly that includes a ventilation device and a mounting assembly herein explained above. Accordingly, the present disclosure provides the mounting assembly 100 that foregoes the use of sealant in favor of both the gasket 106 and the outer protective member 102 which provide a watertight and weatherproof seal to prevent leakage. The outer protective member 102 offers protection of the ventilation device from theft as access to the cap of the bolts 110 is prevented as well as the outer protective member 102 completely covers the ventilation device mount 104, the at least one gasket 106 on its top side and its edges. Furthermore, the gasket 106 and the outer protective member 102 provides rigidity and support to the structure and the ventilation device, thereby improving the strength of the attachment of the ventilation device. Similarly, the bottom mounting member 108 also provides rigidity and support to the structure and the ventilation device. The mounting assembly 100 further enables easier installation and less potential for user error. Additionally, the mounting assembly 100 provides increased safety of occupants of the vehicle due to the orientation of the components' thread holes that accept the mounting screws.

While the above description contains specific details regarding certain elements, embodiments, and other teachings, it is understood that embodiments of the disclosure or any combination of them may be practiced without these specific details. These details should not be construed as limitations on the scope of any embodiment, but merely as exemplifications of the presently preferred embodiments. In other instances, well known structures, elements, and techniques have not been shown to clearly explain the details of the disclosure.

What is claimed is:

1. A mounting assembly for attaching a ventilation device to a structure having an inner surface, an outer surface, and a first opening extending therebetween, comprising:

- an outer protective member configured to have a top side and a bottom side, the outer protective member comprising a plurality of first threaded holes that are positioned at the bottom side of the outer protective member, wherein each of the plurality of first threaded holes is configured to have a first depth at the bottom side, thereby forming a plurality of non-through threaded holes on the bottom side and forming the top side as plain surface;
- a plurality of sealing members;
- at least one gasket; and
- a bottom mounting member.

2. The mounting assembly of claim 1, wherein the bottom side corresponds to an outer surface of the structure and the top side is a side that is opposite to the bottom side and is exposed to an outside environment.

3. The mounting assembly of claim 1, wherein the outer protective member further comprises:

- a second opening; and
- a plurality of first side walls that extend towards the outer surface of the structure, thereby forming an enclosure to cover edges of the at least one gasket and a ventilation device mount, wherein each of the plurality of first side walls is configured to have a first height.

4. The mounting assembly of claim 1, wherein the outer protective member is positioned above a ventilation device mount which is positioned above the at least one gasket.

5. The mounting assembly of claim 4, wherein the ventilation device mount comprises:

a third opening;

a first frame member configured to form the third opening, wherein the first frame member comprises a plurality of second side walls that extend towards the outer surface of the structure and configured to have a second height;

a second frame member that is positioned outboard of the first frame member; and a mounting plate configured to be formed around an outer periphery of the second frame member.

6. The mounting assembly of claim 5, wherein the third opening of the ventilation device mount is configured to receive at least a portion of the ventilation device therein, wherein the third opening corresponds to a shape and size of the ventilation device.

7. The mounting assembly of claim 5, wherein the first frame member and second frame member are configured to be placed at a first distance, thereby forming a groove portion in the ventilation device mount to enable to fit the ventilation device with the ventilation device mount.

8. The mounting assembly of claim 5, wherein the outer protective member is positioned above the mounting plate that comprises a plurality of second threaded holes being through holes, wherein each of the plurality of second threaded holes is aligned with a corresponding first threaded hole in the outer protective member when the outer protective member is positioned above the ventilation device mount.

9. The mounting assembly of claim 1, wherein the outer protective member comprises a plurality of counter bores at the bottom side for receiving the plurality of sealing members, wherein the plurality of sealing members are positioned between the outer protective member and a ventilation device mount.

10. The mounting assembly of claim 9, wherein each of the plurality of counter bores is configured to have a central axis that extends vertically when viewed from a top of the outer protective member and further configured to pass through a center of each of the plurality of counter bores, wherein the central axis of each of the plurality of counter bores coincides with a central axis of each of a plurality of first threaded holes in the outer protective member.

11. The mounting assembly of claim 1, wherein the at least one gasket is positioned on the outer surface of the structure around the first opening in the structure, wherein the first opening corresponds to a shape and a size of the ventilation device.

12. The mounting assembly of claim 11, wherein the at least one gasket comprises a fourth opening similar to the first opening, a first outside flange, a plurality of third threaded holes that are uniformly distributed at the first outside flange, wherein the plurality of third threaded holes are through holes.

13. The mounting assembly of claim 1, wherein the bottom mounting member is positioned at the inner surface of the structure, wherein the bottom mounting member comprises a fifth opening similar to the first opening, a second outside flange, and a plurality of fourth threaded holes that are uniformly distributed in the second outside flange, wherein the plurality of fourth threaded holes are through holes.

14. The mounting assembly of claim 1, wherein the structure comprises a plurality of screw holes around a periphery of the first opening thereof, each of the plurality of screw holes is aligned with a corresponding first, second, third, and fourth threaded hole in the outer protective member, a ventilation device mount, the at least one gasket, and the bottom mounting member, respectively.

15. The mounting assembly of claim 1, wherein the structure is a roof of a vehicle, and the ventilation device is a vent fan.

16. The mounting assembly of claim 1, wherein each of the outer protective member, the at least one gasket, and the bottom mounting member is configured to have rounded corners at an inner periphery and an outer periphery.

17. The mounting assembly of claim 1, further comprising a plurality of bolts, each bolt having a button head cap, for passing through corresponding holes in each of a ventilation device mount, the at least one gasket, and the bottom mounting member, respectively from the inner surface of the structure.

18. A ventilation assembly for attaching to a structure, comprising:

a ventilation device; and a mounting assembly comprising:

an outer protective member configured to have a top side and a bottom side, the outer protective member comprising a plurality of first threaded holes that are positioned at the bottom side of the outer protective member, wherein each of the plurality of first threaded holes is configured to have a first depth at the bottom side, thereby forming a plurality of non-through threaded holes on the bottom side and forming the top side as a plain surface;

a plurality of sealing members;

at least one gasket;

a bottom mounting member; and a plurality of bolts.

19. A method of attaching a ventilation device to a structure having an inner surface, an outer surface and a first opening therebetween, comprising:

positioning at least one gasket on the outer surface of the structure around the first opening;

positioning a ventilation device mount above the at least one gasket, wherein the ventilation device mount is configured to receive the ventilation device within a third opening therein;

positioning a plurality of sealing members in an outer protective member;

placing the outer protective member along with the plurality of sealing members above the ventilation device mount;

placing a bottom member on the inner surface of the structure around the first opening; and passing each of a plurality of bolts through respective holes in each of the ventilation device mount, the at least one gasket, and the bottom mounting member, respectively, and thereafter fastening each of the plurality of bolts into corresponding blind holes provided in an underside of the outer protective member for attaching the ventilation device to the structure.

* * * * *